United States Patent
Yang

(10) Patent No.: US 7,632,048 B2
(45) Date of Patent: Dec. 15, 2009

(54) REAMING MACHINE

(76) Inventor: Jack Yang, No. 176, Yuanhuan S. Rd., Fengyuan City, Taichung County (TW)

( * ) Notice: Subject to any disclaimer, the term of this patent is extended or adjusted under 35 U.S.C. 154(b) by 582 days.

(21) Appl. No.: 11/476,151

(22) Filed: Jun. 28, 2006

(65) Prior Publication Data

US 2008/0003071 A1 Jan. 3, 2008

(51) Int. Cl.
*B23B 39/00* (2006.01)
(52) U.S. Cl. .................. 408/87; 408/103; 408/130; 408/234; 408/241 S
(58) Field of Classification Search .............. 144/135.2; 408/16, 36, 38, 87, 103, 110, 111, 129, 130, 408/234, 241 S, 67
See application file for complete search history.

(56) References Cited

U.S. PATENT DOCUMENTS

| | | | | |
|---|---|---|---|---|
| 1,747,418 A | * | 2/1930 | Bishop et al. ............... 408/14 |
| 2,535,670 A | * | 12/1950 | Croft, Sr. ..................... 408/29 |
| 2,567,191 A | * | 9/1951 | De Anguera ................. 227/116 |
| 2,922,323 A | * | 1/1960 | Weidner ...................... 408/17 |
| 3,037,405 A | * | 6/1962 | Steyskal ..................... 408/241 R |
| 3,041,896 A | * | 7/1962 | May ............................ 408/11 |
| 3,223,131 A | * | 12/1965 | Hovermale ................. 144/3.1 |
| 4,484,608 A | * | 11/1984 | Ferdinand et al. ......... 144/135.3 |
| 4,485,857 A | * | 12/1984 | Norlie et al. ................ 144/424 |
| 4,694,871 A | * | 9/1987 | Jenkner ...................... 144/35.1 |
| 5,275,517 A | * | 1/1994 | Turnipseed et al. ......... 409/184 |
| 6,015,247 A | * | 1/2000 | Branaman ................... 408/1 R |

\* cited by examiner

*Primary Examiner*—Daniel W Howell
(74) *Attorney, Agent, or Firm*—Alan Kamrath; Kamrath & Associates PA

(57) ABSTRACT

A reaming machine includes a machine body; a retractable fixture installed above the machine body and used to press against a workpiece and fix the workpiece; and a vertical wall disposed inside the machine body. Two slide rods are installed to the vertical wall. A slide seat is slidably coupled to the two slide rods. A driving source is fixed to the slide seat. A piston rod is installed to the bottom of the slide seat. A hydraulic cylinder enables the piston rod to move telescopically. The piston rod further enables the driving source to move up and down. A tool seat is installed to the driving source. A reamer is installed at the top of the tool seat and can ream a hole on the workpiece. As the reamed hole faces downward, the wooden dust and debris generated in reaming will fall into the interior of the machine body.

4 Claims, 5 Drawing Sheets

REAMING MACHINE

FIELD OF THE INVENTION

The present invention relates a reaming machine and, particularly to a reaming machine which can prevent debris from being dispersed into the air via extending a reamer upward from the interior of the machine body to ream the workpiece disposed above.

BACKGROUND OF THE INVENTION

Generally, when the operator intends to ream a hole on a workpiece, he will place the workpiece on the machine table of a reaming machine and fasten the workpiece with a fixture. The reamer is installed above the machine table and can descend to ream the workpiece. When the fast-rotating reamer is reaming a hole on the workpiece, the reamer jets out much wooden debris and dust. Thus, the operator has to wear a pair of goggles to protect his eyes. However, the wooden debris and dust dispersed to the air is hard to collect. Consequently, the operator will inhale a lot of wooden debris and dust, which will affect the health of the operator in the long run. Besides, cleaning wooden debris and dust deposited everywhere in the factory is laborious and time-consuming work.

SUMMARY OF THE INVENTION

The primary objective of the present invention is to provide a reaming machine, which comprises: a hollow machine body; a fixture installed above the machine table of the machine body and able to descend and press against a workpiece; and a vertical wall disposed inside the machine body. Two slide rods are respectively installed in the left side and the right side of the vertical wall. A slide seat is slidably coupled to those two slide rods. A driving source is fixed to the slide seat, and a piston rod is installed to the bottom of the slide seat. A hydraulic cylinder enables the piston rod to move telescopically, and the piston rod further enables the driving source to move up and down. A tool seat is installed at the top of the driving source, and a rotatable reamer is installed at the top of the tool seat. The tool seat can raise the reamer upward to ream a hole on the workpiece. As the reamed hole faces downward, the wooden dust and debris generated in reaming will fall into the interior of the machine body. Thus, the wooden dust and debris can be easily collected, and air pollution can be prevented.

DETAILED DESCRIPTION OF THE PREFERRED EMBODIMENTS

Figure 1:
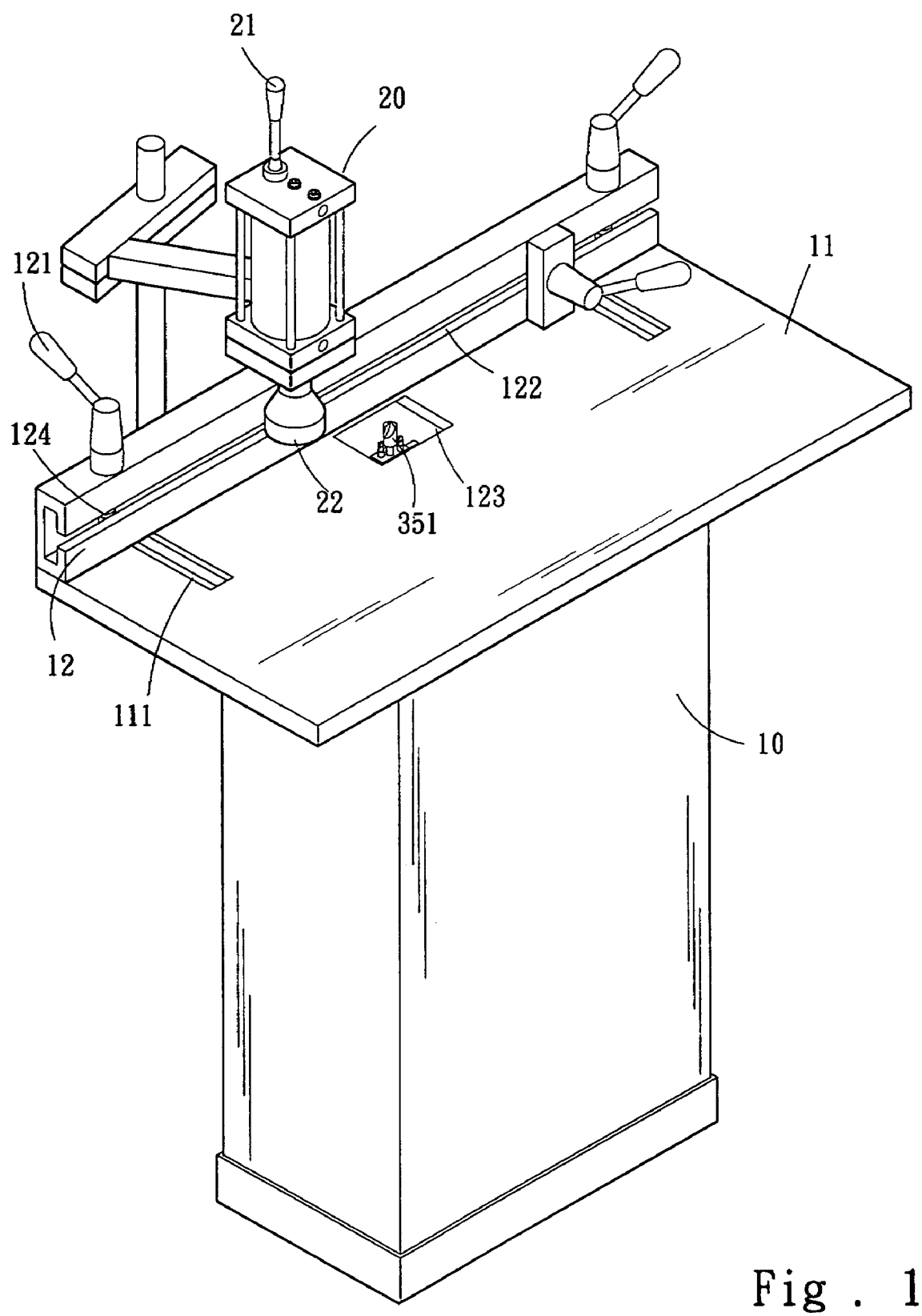
FIG. 1 is a perspective view schematically showing a preferred embodiment of the present invention.
Figure 2A:
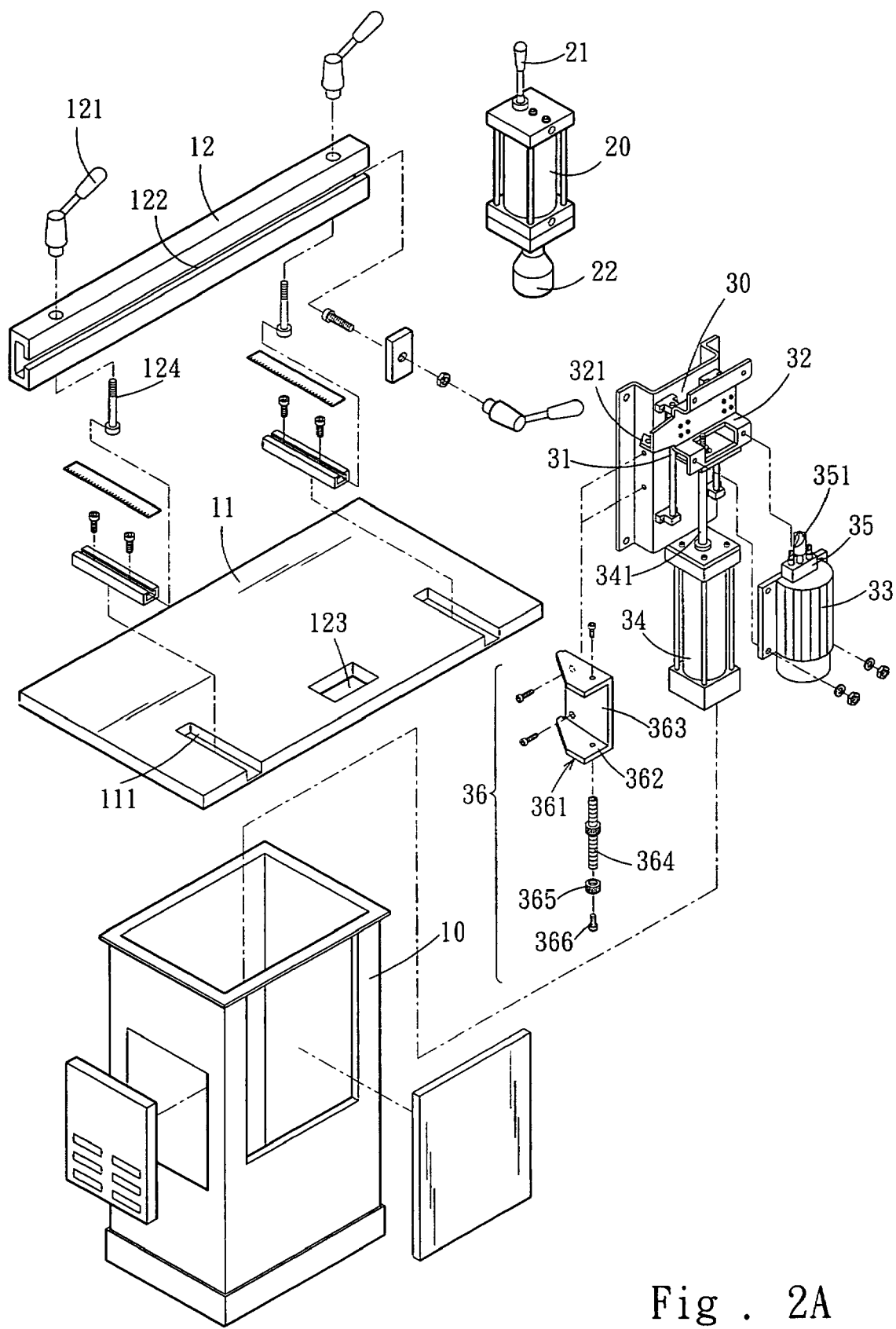
FIG. 2A is a perspective exploded view of a preferred embodiment of the present invention.
Figure 2B:
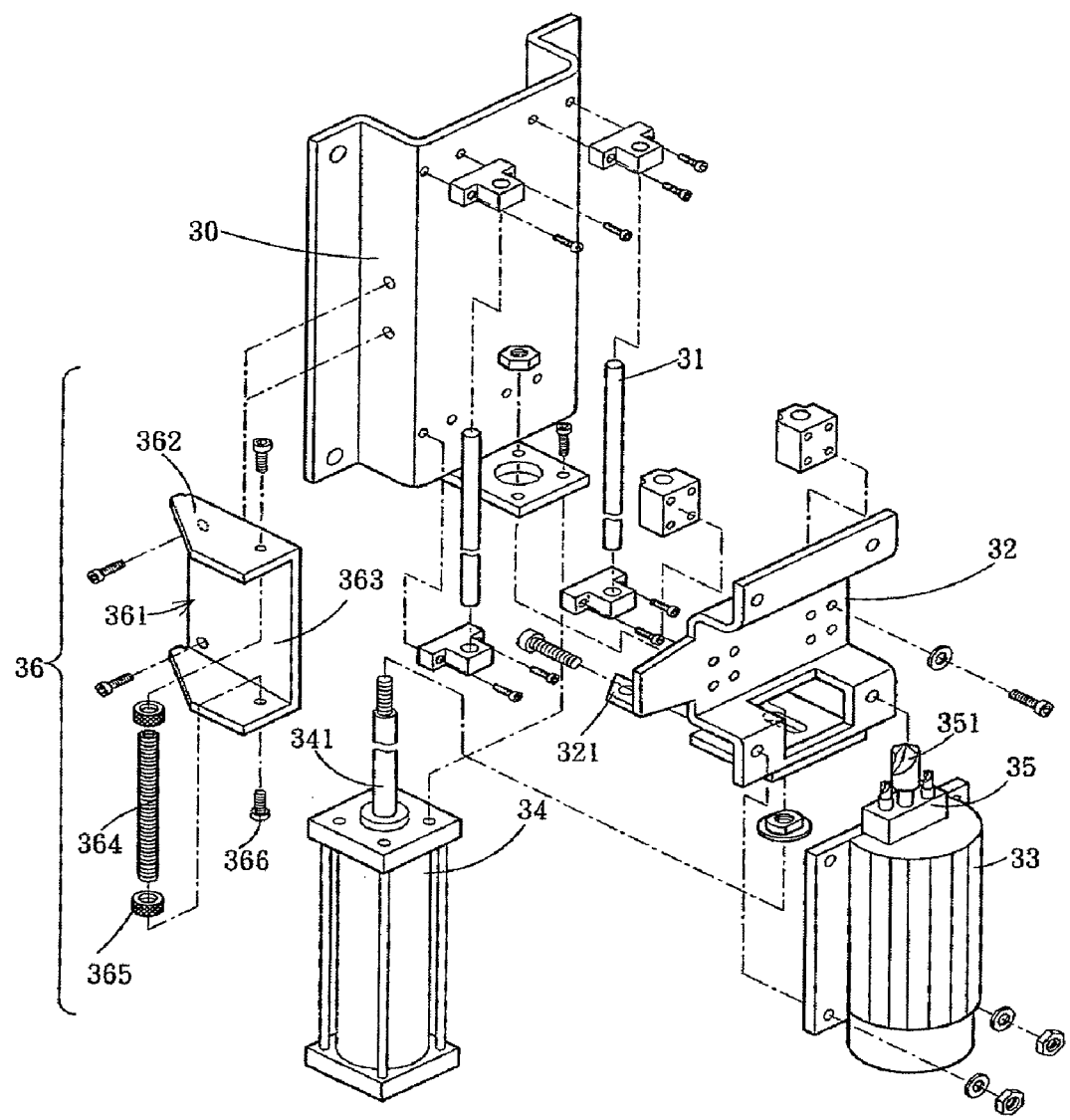
FIG. 2B is an enlarged perspective exploded view of a portion of elements shown in FIG. 2A.

Refer to FIG. 1, FIG. 2A, and FIG. 2B. The reaming machine of the present invention comprises: a machine body 10, a fixture 20, a vertical wall 30, and an adjust unit 36. The abovementioned parts and the operation procedures of the reaming machine of the present invention are to be described in detail below.

The machine body 10 is a hollow structure with a substantially rectangular section. A machine table 11 is horizontally disposed above the machine body 10. A pair of slide ways 111 is formed in the rear side of the machine table 11. A clamping unit 12 is installed above the pair of slide ways 111, and two rotary fixing handles 121 are respectively installed in the left side and the right side of the top of the clamping unit 12. A screw 124 is installed to the lower end of the rotary fixing handle 121 and penetrates the clamping unit 12. The lower end of the screw 124 has a nut larger than the screw 124, and the nut is to be pressed against the slide way 111. The user can rotate the rotary fixing handles 121 to make the nuts tightly press against the slide ways 111, and the clamping unit 12 is, thus, fixed at a predetermined position in the front-rear direction. The clamping unit 12 has a clamping slot 122 disposed along the left-right direction. The machine table 11 also has a rectangular through-hole 123.

Figure 4:
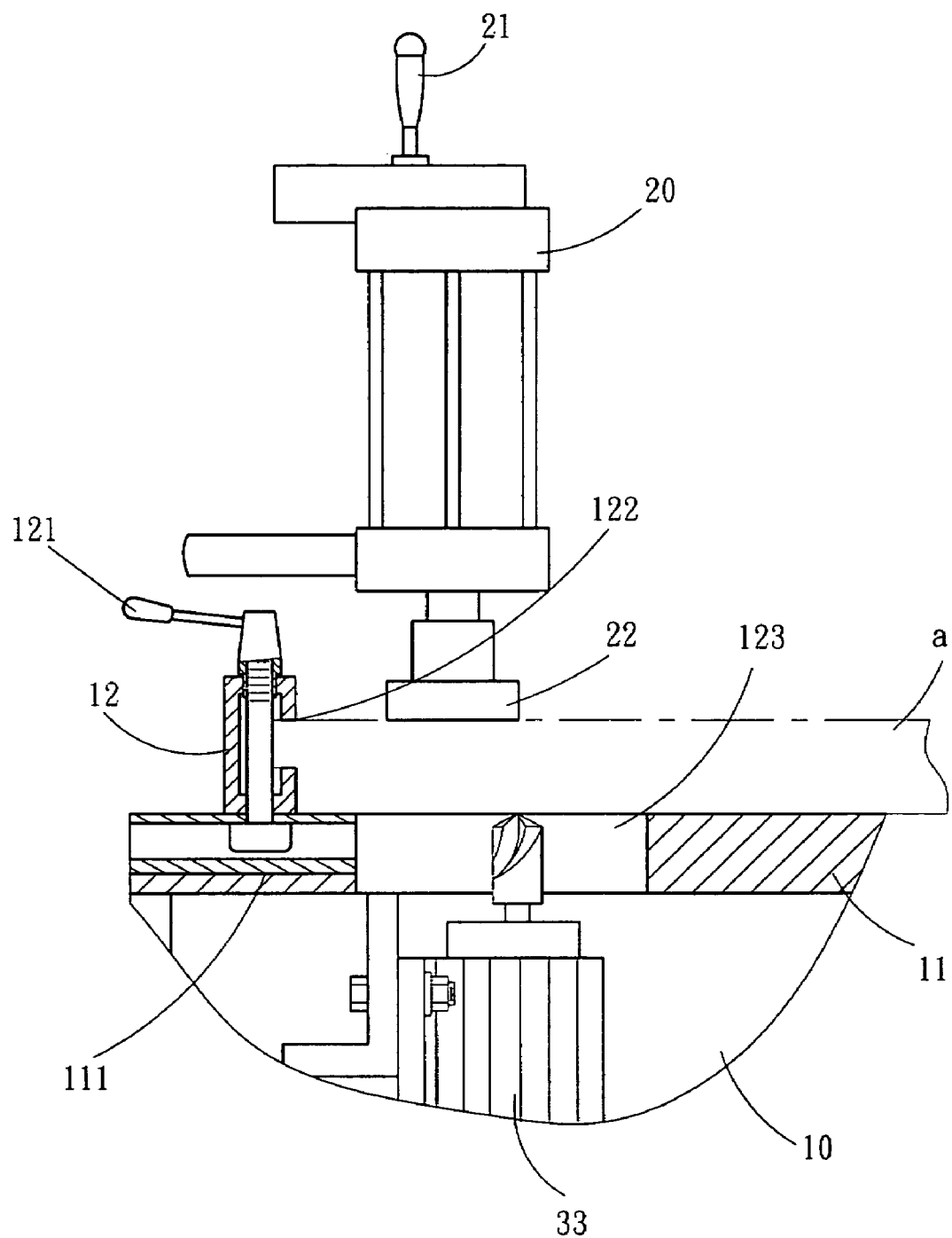
FIG. 4 is a diagram schematically showing the operation of a preferred embodiment of the present invention.

Refer to FIG. 4. The fixture 20 is a hydraulic cylinder installed above the machine table 11. The hydraulic cylinder has a handle 21 at the top thereof and a press head 22 at the bottom thereof. The user operates the handle 21 to lower the press head 22, and a workpiece a is, thus, pressed tightly.

Figure 3:
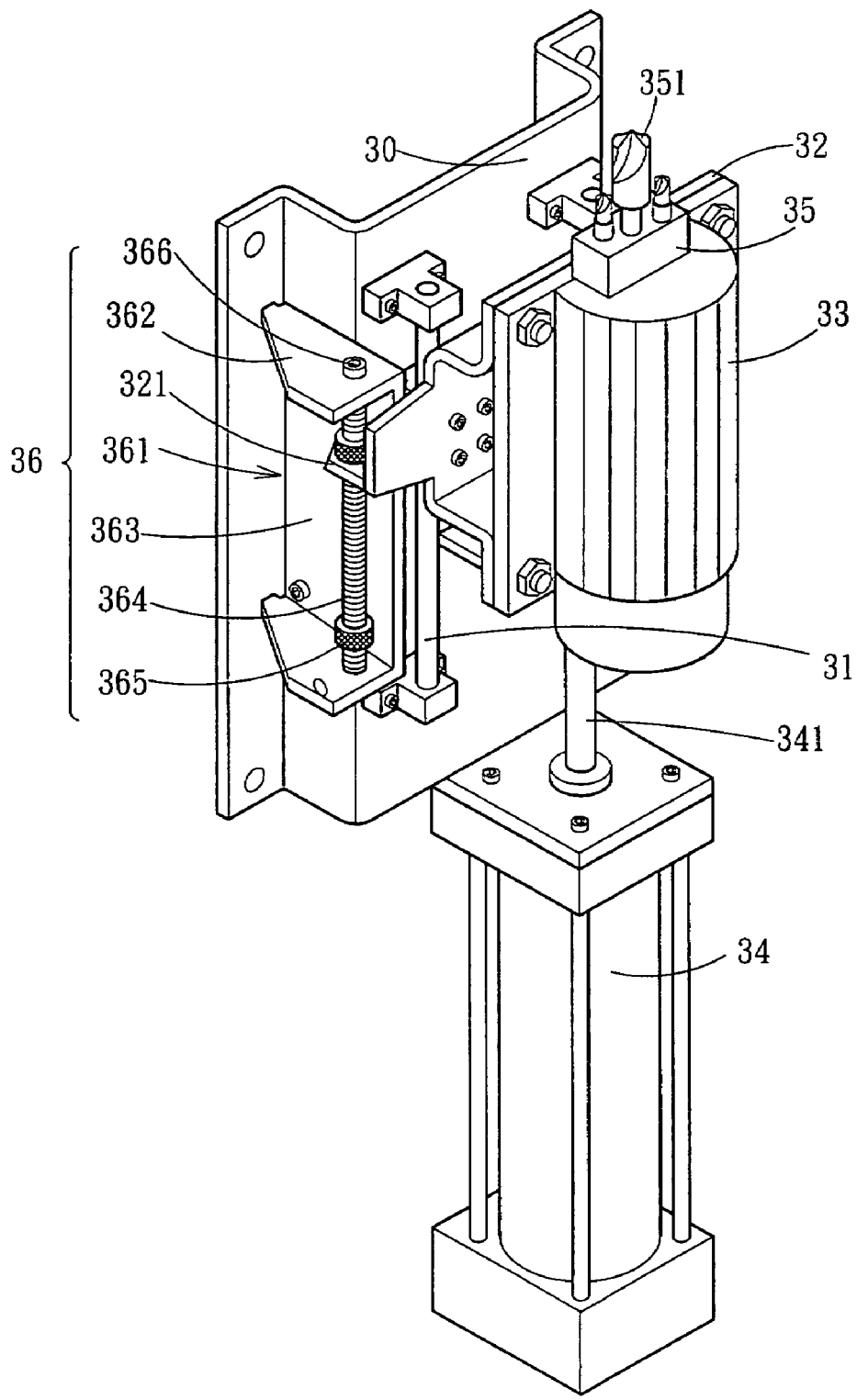
FIG. 3 is a partial perspective view of a preferred embodiment of the present invention.

Refer to FIG. 3. The vertical wall 30 is fastened to the internal wall of the machine body 10. Two slide rods 31 are respectively installed in the left side and the right side of the vertical wall 30. A slide seat 32 is slidably coupled to those two slide rods 31. The slide seat 32 is a plate-like structure with a substantially U-shape section. A driving source 33 (such as a motor) is installed to one side of the slide seat 32, and a hydraulic cylinder 34 is installed near the bottom of the slide seat 32. A piston rod 341, which can move up and down, interconnects the top of the hydraulic cylinder 34 and the bottom of the slide seat 32. A tool seat 35 is installed at the top of the driving source 33, and a rotatable reamer 351 is installed at the top of the tool seat 35. Further, a through-holed lug 321 extends from one side of the slide seat 32.

The adjust unit 36 has a U-shape lug 361 with its opening facing outward. Two horizontal wedge-shape plates 362 are respectively installed to the upper end and the lower end of the lug 361, and a vertical plate 363 is used to connect those two wedge-shape plates 362, and the vertical plate 363 is fixed to one side of the vertical wall 30. A screw 364 is vertically installed in between those two wedge-shape plates 362 and penetrates the through-holed lug 321 extending from one side of the slide seat 32. Two adjust knobs 365 are respectively threadably installed to the upper side and the lower side of the screw 364. Two screws 366, which penetrate the upper and lower wedge-shape plates 362 of the U-shape lug 361, are respectively screwed into the threaded holes at the top and the bottom of the screw 364, and the screw 364 is thus fixed to the U-shape lug 361.

Refer to FIG. 4 for the operation of the reaming machine of the present invention. Firstly, the rotary fixing handles 121 at the top of the clamping unit 12 are rotated to loosen the screws 124, and next, the clamping unit 12 is moved to an appropriate position. Next, the to-be-reamed surface of a workpiece a (such as a wooden plate) is faced downward and disposed on the machine table 11. Next, the rear end of the workpiece a is inserted into the clamping slot 122 of the clamping unit 12. Thus, the to-be-reamed area of the workpiece a is located within the through-hole 123 of the machine table 11. Next, the user presses down the handle 21 of the fixture 20. Then, the press head 22 is lowered to tightly press against the workpiece a, and the workpiece a is, thus, fixed.

Next, the user controls the hydraulic cylinder 34 to extend the piston rod 341 upward, and the driving source 33 is also pushed upward. Next, the tool seat 35 at the top of the driving source 33 drives the reamer 351 to ream a hole on the workpiece a. As the reamed hole faces downward, the wooden dust and debris generated in reaming will fall into the interior of the machine body 10. Therefore, the wooden dust and debris can be easily collected, and air pollution can be prevented. Further, as the workpiece a can cover the through-hole 123 of the machine table 11, the wooden dust and debris is unlikely to jet out and hurt the eyes of the user.

Further, the user can rotate two adjust knobs 365 on the screw 364 of the adjust unit 36 to modify the distance between those two adjust knobs 365. Thus, the vertical travel of the slide seat 32 can be adjusted, and the rising distance of the reamer 351 can also be controlled.

Those described above are only the preferred embodiments to clarify the present invention. However, it is not intended to limit the scope of the present invention, and any equivalent modification and variation according to the spirit of the present invention is to be also included within the scope of the present invention.

What is claimed is:

1. A reaming machine comprising:
    a machine body which is hollow and having a machine table with a through-hole;
    a fixture installed above said machine table and having a handle at a top thereof used to control a press head at a bottom of said fixture to descend and press against a top surface of a workpiece;
    a vertical wall installed in an interior of said machine body and including two slide rods, respectively, disposed in a left side and a right side of the interior;
    a slide seat slidably connected to said two slide rods;
    a driving source fixed to one side of said slide seat;
    a hydraulic cylinder installed near a bottom of said slide seat;
    a piston rod being vertically retractable and disposed at a top of said hydraulic cylinder, with a top of the piston rod connected to said slide seat;
    a tool seat disposed at a top of said driving source; and
    a reamer being rotatable and installed to said tool seat, wherein two slide ways are installed in a rear side of said machine table and arranged in a front-rear direction; a clamping unit is installed above said two slide ways, and a clamping slot is formed in a front side of said clamping unit and used to clamp a rear end of the workpiece; two rotary fixing handles are respectively installed in a left side and a right side of a top of said clamping unit; two screws penetrate a bottom of said clamping unit, and a top of each said screw is threadably installed to an associated rotary fixing handle, and a bottom of each said screw has a nut larger than said screw and pressing against an associated slide way.

2. The reaming machine according to claim 1, wherein said machine body is a hollow rectangular column, and said vertical wall is fastened to a wall inside said machine body.

3. The reaming machine according to claim 1, wherein a through-holed lug extends from one side of the slide seat; an adjust unit is installed to one side of said vertical wall; said adjust unit includes a lug with an opening facing outward; two horizontal plates, respectively, installed to an upper end and a lower end of said lug; a vertical plate connecting said two horizontal plates and fixed to said vertical wall; a screw vertically installed between said two horizontal plates and penetrating said through-holed lug of said slide seat; and two adjust knobs, respectively, threadably installed to an upper side and a lower side of said screw.

4. The reaming machine according to claim 1, wherein said driving source is a motor and said fixture is a hydraulic cylinder.

* * * * *